US012324458B1

(12) United States Patent
Shoched

(10) Patent No.: US 12,324,458 B1
(45) Date of Patent: Jun. 10, 2025

(54) ALL GLASS BUCKET VAPORIZER

(71) Applicant: DES Products Ltd., Lambertville, MI (US)

(72) Inventor: Dana E. Shoched, Lambertville, MI (US)

(73) Assignee: DES PRODUCTS LTD., Lambertville, MI (US)

(*) Notice: Subject to any disclaimer, the term of this patent is extended or adjusted under 35 U.S.C. 154(b) by 0 days.

(21) Appl. No.: 19/000,293

(22) Filed: Dec. 23, 2024

(51) Int. Cl.

| | |
|---|---|
| ***A24F 40/42*** | (2020.01) |
| ***A24F 40/10*** | (2020.01) |
| ***A24F 40/46*** | (2020.01) |
| ***A24F 40/48*** | (2020.01) |
| ***A24F 40/57*** | (2020.01) |
| ***A24F 40/60*** | (2020.01) |
| ***A24F 40/90*** | (2020.01) |
| ***H05B 3/34*** | (2006.01) |

(52) U.S. Cl.
CPC ............. *A24F 40/42* (2020.01); *A24F 40/10* (2020.01); *A24F 40/46* (2020.01); *A24F 40/48* (2020.01); *A24F 40/57* (2020.01); *A24F 40/60* (2020.01); *A24F 40/90* (2020.01); *H05B 3/34* (2013.01)

(58) Field of Classification Search
None
See application file for complete search history.

(56) References Cited

U.S. PATENT DOCUMENTS

| | | | | |
|---|---|---|---|---|
| 2020/0329763 | A1* | 10/2020 | Kerr | A61M 15/0066 |
| 2021/0000177 | A1* | 1/2021 | Novak, III | H05B 1/0244 |
| 2022/0046992 | A1* | 2/2022 | Shoched | A24F 40/485 |
| 2022/0304384 | A1* | 9/2022 | Liu | A24F 40/46 |

* cited by examiner

*Primary Examiner* — Philip Y Louie
*Assistant Examiner* — Nicole A Szumigalski
(74) *Attorney, Agent, or Firm* — Volpe Koenig

(57) ABSTRACT

An electronic vaporizer for vaporizing liquids is provided herein featuring a cylindrical, glass reservoir tank within a non-cylindrical case. The glass reservoir tank may reside between a detachable mouthpiece disposed at an upper section of the case and a lower section of the case that houses the interior components of the electronic vaporizer including the atomizer, battery, circuit board, and heating element comprising a heating wire and a cotton-free ceramic bucket. The reservoir tank may further include at least one tube providing an air flow passage that may be made of glass. The at least one tube may extend between the mouthpiece and the heating element. Based upon the cylindrical, glass reservoir tank within the non-cylindrical case, the electronic vaporizer may provide a desirable oxidation of vape oils within the glass reservoir tank while maintaining the desired taste of the vape oil, depending the terpene content of the vape oil.

20 Claims, 12 Drawing Sheets

ALL GLASS BUCKET VAPORIZER

FIELD OF INVENTION

The present invention relates to electronic vaporizers, and more particularly to an electronic vaporizer having a non-cylindrical case housing a cylindrical glass reservoir.

BACKGROUND

Reservoir tanks for holding liquids and vape oils within electronic vaporizers are known in the art. Currently on the market, reservoir tanks are manufactured with plastic materials to fit within non-cylindrical cases that house the various components of an electronic vaporizer. Due to the demand for a non-cylindrical form factor for the cases that are ergonomic for a user's vaping experience, current reservoir tanks are manufactured with plastic materials, rather than glass, to reduce manufacturing costs and accommodate the contours of the non-cylindrical cases. However, plastic reservoir tanks may adversely influence the vaping experience as they affect the oxidation of the vape oils within the reservoir tanks and the taste of the vape oil, depending the terpene content of the vape oil. Accordingly, there is a need to provide for an electronic vaporizer featuring a glass reservoir tank that may be manufactured more cost effectively to accommodate the demand for non-cylindrical cases without detracting from the flavor of the vape oil. A cylindrical glass reservoir may be manufactured more efficiently while also maintaining compatibility with the desire for non-cylindrical cases.

SUMMARY

Described herein is an electronic vaporizer for vaporizing liquids including a mouthpiece; and a non-cylindrical case having a first end coupled to the mouthpiece. The apparatus also includes the non-cylindrical case configured to house interior components including: a cylindrical glass reservoir; a battery; a heating element, and a tube extending from the heating element past the cylindrical glass reservoir to the mouthpiece.

Implementations may include one or more of the following features. The apparatus for vaporizing liquids where the heating element includes: a porous ceramic bucket, a heating wire coupled to the battery, and a first portion of the heating wire that is partially embedded in the ceramic bucket. The porous ceramic bucket is cotton-free. The apparatus for vaporizing liquids may include: a push-button disposed on the non-cylindrical case configured to select at least one predetermined voltage provided by the battery to the heating wire, the at least one predetermined voltage associated with a temperature of the heating element. The non-cylindrical case further may include a window configured to provide visibility of the cylindrical glass reservoir, where a width of the window is narrower than a width of the cylindrical glass reservoir. The non-cylindrical case may be made from any material, including for example, aluminum. The non-cylindrical case may include an led indicator. At least a portion of an interior diameter of the non-cylindrical case is larger than an exterior diameter of the cylindrical glass reservoir. The non-cylindrical case further may include a second end including a charging port. The tube and the cylindrical glass reservoir may be made from any type of glass including for example: quartz glass, borosilicate glass, soda-lime glass, aluminosilicate glass, lead-free crystal glass, or tempered glass.

Also described herein is an electronic vaporizer for vaporizing liquids including a mouthpiece; a removable pod including: a cylindrical glass reservoir, a heating element, a tube extending from the heating element past the cylindrical. The apparatus also includes glass reservoir to the mouthpiece; and at least one battery connector disposed at a lower portion of the pod. The apparatus also includes and a non-cylindrical case having an opening to slidably receive the removable. The apparatus also includes pod, the non-cylindrical case including a battery, where the removable pod is insertable within and removable from the non-cylindrical case.

Implementations may include one or more of the following features. The apparatus for vaporizing liquids where the heating element includes: a porous ceramic bucket, and a heating wire configured to detachably couple to the battery via the at least one battery connector when the pod is inserted within the non-cylindrical case. The porous ceramic bucket is cotton-free. The apparatus for vaporizing liquids may include: a push-button disposed on the non-cylindrical case configured to select at least one predetermined voltage provided by the battery to the heating wire, the at least one predetermined voltage associated with a temperature of the heating element. The removable pod further may include a window configured to provide visibility of the cylindrical glass reservoir, where a width of the window is narrower than a width of the cylindrical glass reservoir. The non-cylindrical case is may include of aluminum. The non-cylindrical case includes an led indicator. The apparatus for vaporizing liquids may include another non-cylindrical case having a second shape different than a first shape of the non-cylindrical case, wherein the removable pod is insertable within and removable from the another-cylindrical case. The non-cylindrical case further may include a second end including a charging port. The tube and the cylindrical glass reservoir are may include of quartz glass.

These and other objects, features and advantages will be apparent from the following detailed description of illustrative embodiments thereof, which is to be read in connection with the accompanying drawings.

BRIEF DESCRIPTION OF THE DRAWINGS

A more detailed understanding may be had from the following description, given by way of example in conjunction with the accompanying drawings herein.

DETAILED DESCRIPTION OF THE PREFERRED EMBODIMENTS

Figure 1A:
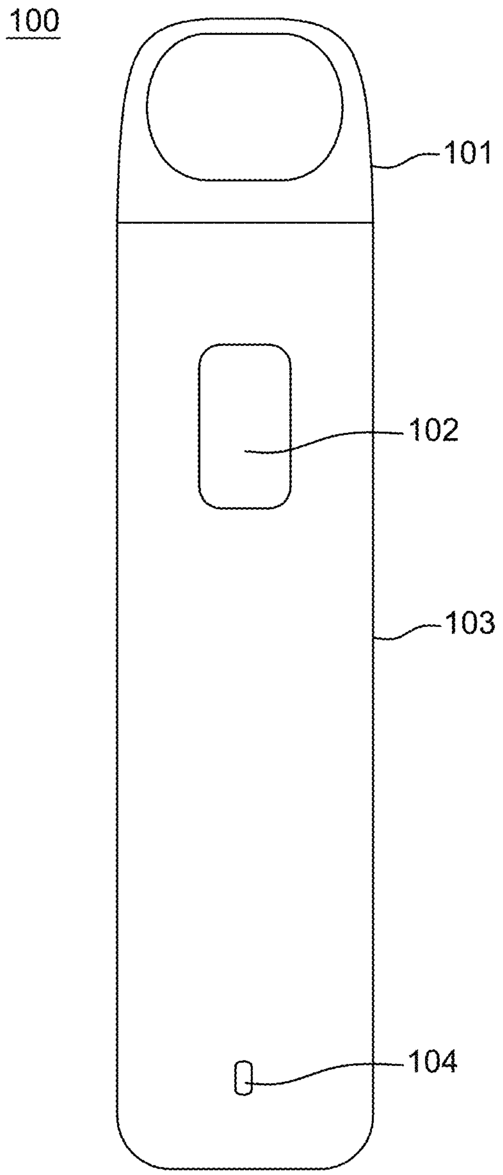
FIG. 1A shows a perspective view of an electronic vaporizer having a non-cylindrical case housing a cylindrical glass reservoir of the herein described embodiments.

Various embodiments are described herein where like references to figures are used to describe like features. Each feature or element may be used alone without other features and elements or in various combinations with or without other features and elements.

The present embodiments relate to an improved reservoir tank design for holding liquids and vape oils within electronic vaporizers. In general, a vaporizer device utilizes a battery that powers the heating device or atomizer, which vaporizes a liquid held inside a reservoir tank or cartridge. Reservoir tanks for electronic vaporizers are utilized for holding liquids and vape oils that are heated by the adjacent atomizer to produce vapors within the airway leading to the mouthpiece of the electronic vaporizer. The reservoir tank may be coupled to the battery of an electronic vaporizer in a case that houses the components of the electronic vaporizer including the atomizer, battery, heating element, heating wire, and circuit board, for example.

Liquid from the reservoir tank flows to the atomizer, which is vaporized at a temperature level, determined, in part, by the voltage from the battery. When a user applies suction to the mouthpiece of the vaporizer, air moves into the case of the vaporizer through an air intake aperture, which may be adjustable, located at the bottom or side section of the case of the electronic vaporizer. At a point when a user draws air through the mouthpiece, air may pass through one or more intake air apertures, through the case of the electronic vaporizer, and to the mouthpiece. A vaporizer generally utilizes convection heating to heat the air within the case to a certain temperature; when the heated air passes through the liquid, the liquid is vaporized. Particular liquids and vape oils may be added to the reservoir tank based upon user preferences, such as flavor and vaporization properties.

The reservoir tank may be made of glass, such as quartz glass, and reside within the case of the electronic vaporizer between the mouthpiece at the top end of the vaporizer and a lower section of the case that houses the interior components such as the atomizer, battery, heating element, heating wire, and circuit board.

In addition, the reservoir tank may further include at least one tube providing an air flow passage that may be made of glass, including quartz glass. The at least one tube providing an air flow passage may extend axially through the reservoir tank to provide an airway extending between the mouthpiece and the atomizing core. In an embodiment, the reservoir tank may feature the tube providing an air flow passage extending through a central portion of the tank. In another embodiment, the reservoir tank may feature one tube providing an air flow passage through a side of the tank (rather than a central portion of the tank), extending between the mouthpiece and the atomizing core. In yet another embodiment, the reservoir tank may feature a first tube and a second tube providing air flow passages through a respective first and a respective second side of the reservoir tank, with each tube extending between the mouthpiece and the atomizing core. In certain embodiments, the one or more tubes providing an air flow passage may be coupled to at least one sensor to measure or track an amount of air flowing through the tube or a pressure differential within the one or more tubes that may be associated with a user's vaping and/or drawing on the mouthpiece.

The bottom section of the electronic vaporizer may include a charging port. In an example the charging port may be a type-c charging port, such as a USB-C, or Universal Serial Bus Type-C that may provide a single reversible connector to transmit both power for charging and data for transfers. The bottom section of the electronic vaporizer may also feature one or more intake air apertures that may be adjustable and may provide air intake through the housing of the bottom section electronic vaporizer. When a user draws air through the mouthpiece, air may pass through the one or more intake air apertures at the bottom section of the electronic vaporizer, through the atomizer and liquid or vape oil, and then through the one or more tubes providing air flow passages through the reservoir tank to the mouthpiece. The one or more intake air apertures at the bottom section of the electronic vaporizer may be positioned adjacent to the type-c charging port.

The non-cylindrical case of the electronic vaporizer may further house a heating element. The heating element may comprise a heat resistant wire such as a Kanthal® wire completely embedded or partially embedded in a porous ceramic element. The heating element may be a cotton-free bucket comprising the porous ceramic material formed in a concave, bowl shaped structure to collect the liquid or vape oil that flows downward from the reservoir. In an embodiment, the heating element may be a cotton-free bucket comprising the porous ceramic material formed in a concave, square, oblong bowl shaped structure. The configuration of the wire of the ceramic bucket heating element may feature various configurations as described herein that provide for an even heating distribution within the ceramic bucket heating element. In addition, the ceramic bucket comprising the porous ceramic material with an embedded heating wire as described herein may be cotton-free, thereby avoiding the introduction of chemical materials into the liquid and vape oil during vaping with the electronic vaporizer described herein. Using the cotton-free ceramic bucket heating element, the electronic vaporizer as described herein may eliminate barriers between the oil and the heating element, thereby preserving flavor purity for the user while vaping with the electronic vaporizer.

The concave, bowl-shaped structure of the heating element may be beneficial for collecting the liquid or vape oil that moves downward within the reservoir based upon the downward-gravitational pull on the liquid or vape oil. The liquid or vape oil may be pulled downward through the reservoir toward the concave, bowl-shaped structure based on the downward gravitational pull, rather than based upon an adsorption by a cotton wick, for example. The porosity of the concave, bowl-shaped heating element may enable a desired amount of the liquid or vape oil to move within the porous ceramic material of the heating element, where it may be heated and vaporized to produce the vapor for the electronic vaporizer.

In embodiments of the electronic vaporizer as described herein, the cylindrical, all-glass reservoir may be fixed within the case, such that the reservoir may be accessible to refill the reservoir with liquid or vape oil by removing the mouthpiece from the top of the electronic vaporizer to expose a top opening of the cylindrical, all-glass reservoir. Such embodiments of the electronic vaporizer may provide environmental advantages by enabling the user to reuse the case housing the battery and refillable cylindrical, all-glass reservoir.

In some embodiments of the electronic vaporizer as described herein, the vaporizer may be manufactured such that the mouthpiece is fixed to the case housing the cylindrical, all-glass reservoir. In such embodiments, the entire electronic vaporizer may be disposable, so that once a user has consumed all of the liquid or vape oil within the cylindrical, all-glass reservoir during vaping, the entire electronic vaporizer, including the mouthpiece that is fixed to the case containing the cylindrical, all-glass reservoir and battery, may be discarded.

In other embodiments, the electronic vaporizer as described herein may comprise a wholly removable pod portion including the cylindrical, all-glass reservoir that may be replaced with a new pod, rather than refilling. Additionally the replaceable pods may allow oil manufacturers to sell multiple pods, and the consumer may reuse the battery that is housed within the case and dispose of used-up pods without the need to dispose of the case that houses the battery. Such embodiments of the electronic vaporizer with wholly removable pod portion including the cylindrical, all-glass reservoir may provide environmental benefits by enabling the user to reuse the case housing the battery.

In some embodiments of the electronic vaporizer as described herein that may comprise a wholly removable pod portion including the cylindrical, all-glass reservoir, the mouthpiece may be removable by the user from the top of the wholly removable pod to expose the cylindrical, all-glass reservoir, so that a user may refill and reuse the wholly removable pod portion including the cylindrical, all-glass reservoir.

In yet another embodiment, a wholly removable pod portion including the cylindrical, all-glass reservoir may be interchangeable between different shaped non-cylindrical cases of respective electronic vaporizers, as described herein. In such embodiments, a user may interchange a wholly removable pod with various non-cylindrical cases of respective electronic vaporizers in which the cases may house cylindrical, all-glass reservoirs of different volumes or batteries of different lifespans or power durations, for example.

The structure of the embodiments of the electronic vaporizer as described herein may provide for an improved manufacturing capability to satisfy the demand for a cylindrical, all glass reservoir tank for liquid or vape oil that is capable of residing within a non-cylindrical case. Based on the all-glass cylindrical reservoir for use within a non-cylindrical case, the electronic vaporizer as described herein may promote a desirable oxidation of the vape oils within the reservoir tanks while maintaining the desired taste of the vape oil, depending the terpene content of the vape oil.

Reservoir tanks in current electronic vaporizers are manufactured with molded plastic materials, such as polycyclohexylenedimethylene terephthalate glycol (PCTG) or polyetherimide (PEI) that may negatively impact a user's vaping experience as these materials affect the oxidation of the vape oils within the reservoir tanks and the taste of the vape oil, depending the terpene content of the vape oil. The electronic vaporizer as disclosed herein with cylindrical, all-glass reservoir tank may provide a cost-effective manufacturing alternative to current electronic vaporizers that include PCTG or PEI reservoir tanks while also improving the quality of the taste and flavor of a user's vaping experience with the cylindrical, all-glass reservoir tank that may conveniently reside within an ergonomically shaped, non-cylindrical case.

All-glass vape cartridges may be easier to manufacture in cylindrical shapes due to the inherent properties of glass and the efficiency of production processes. Glass is a brittle material that is more prone to breakage during shaping and handling. Cylindrical designs may provide uniform structural integrity, minimizing stress points that could lead to fractures. Additionally, cylindrical shapes may be well-suited for extrusion and molding processes, which are commonly used in glass production, reducing manufacturing complexity and cost. A cylindrical shape may also facilitate consistent airflow and vapor production while being compatible with standard hardware, making it a desirable option for both practicality and functionality.

The ergonomic form factor of the embodiments of the electronic vaporizer as described herein may provide optionality based upon various sizes of a non-cylindrical case that may maintain the ability to house a cylindrical, all-glass reservoir. In addition, the non-cylindrical shape of the case may provide a comfortable and ergonomic feel in the hand of a user, while a non-cylindrically-shaped mouthpiece that is coupled to the non-cylindrically shaped case may also provide a more ergonomic draw by the user when vaping with the electronic vaporizer, in comparison to a cylindrically-shaped mouthpiece.

FIG. 1A shows an example embodiment of electronic vaporizer 100. The electronic vaporizer 100 as shown in FIG. 1A is oriented vertically and may feature a removable mouthpiece 101 at a top portion. The mouthpiece 101 may feature one or more holes or apertures that enables a user to draw air through the mouthpiece 101, so that air may pass through the case 103 of the electronic vaporizer 100 and through the one or more holes or apertures in the mouthpiece 101. As shown in FIG. 1A, the mouthpiece 101 may feature a non-cylindrical shape that may provide for an ergonomic vaping experience for a user. Although the mouthpiece 101 is illustrated with a non-cylindrical shape, it is understood that other more defined shapes for the mouthpiece 101, including a cylindrical shape, may be contemplated.

Figure 1B:
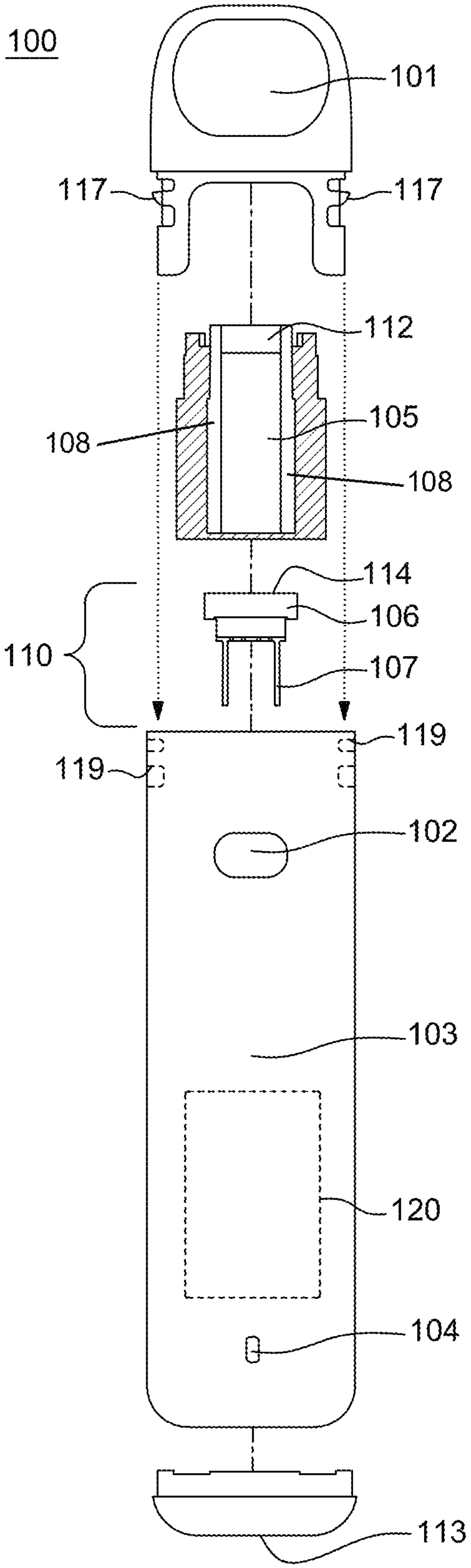
FIG. 1B shows an exploded view of the oral vaporizer cartridge as shown in FIG. 1A.

Referring again to FIG. 1A, the electronic vaporizer 100 may feature a case 103 that may be comprised of a metallic material such as aluminum. As shown in FIG. 1A, the case 103 may feature a non-cylindrical shape, such as a ovular, flattened form that may provide for an ergonomic feel in the hand of a user when using the electronic vaporizer 100. The case 103 may further include a window 102 for purposes of viewing the level, quantity, or clarity of a liquid or vape oil residing within a glass reservoir tank 105 (as shown in FIG. 1B). In addition, the case 103 may also feature an LED light indicator 104 that may provide an indication of a voltage level utilized for vaping, a battery level, a power on/off indicator, or other indications as would be appreciated by those of skill in the art.

Referring to the exploded view of the electronic vaporizer as shown in FIG. 1B, the case 103 may house and contain a cylindrical, all-glass reservoir tank 105 for containing the liquid or vape oil. In the embodiment shown in FIGS. 1A-1B, a user may remove the mouthpiece 101 from the top of the case 103 in order to access the cylindrical, all-glass reservoir tank 105 that may be fixed within the case 103. Such embodiments of the electronic vaporizer 100 may provide environmental advantages by enabling the user to reuse the case 103 housing the battery 120 and refillable cylindrical, all-glass reservoir 105. By removing the mouthpiece 101 from the top of the case 103, the user may access and refill the cylindrical, all-glass reservoir tank 105 with liquids or vape oils in order to utilize the electronic vaporizer 100. A silicone ring 112 may reside at a top portion of the cylindrical, all-glass reservoir tank 105 to protect the glass rim of the cylindrical, all-glass reservoir tank 105 and to provide for a secure seal and connection between the cylindrical, all-glass reservoir tank 105 and mouthpiece 101.

Referring again to FIGS. 1A-1B, in other embodiments, the mouthpiece 101 may be fixed to the case 103 housing the cylindrical, all-glass reservoir 105. In such embodiments, the entire electronic vaporizer 100 may be disposable, so that once a user has consumed all of the liquid or vape oil within the cylindrical, all-glass reservoir 105 during vaping, the entire electronic vaporizer 100, including the mouthpiece 101 that is fixed to the case 103 containing the cylindrical, all-glass reservoir 105 and battery 120, may be discarded.

Referring to the exploded view of FIG. 1B, the mouthpiece 101 may feature grooves 117 that may correspond to and matingly couple with grooves 119 in the case 103. As illustrated by the downward arrows extending from the mouthpiece 101 to the case 103, the mouthpiece 101 may snap into or lock into the case 103 based on the grooves 117, 119. In an embodiment, the mouthpiece 101 may permanently snap into and lock into the case 103, so that the mouthpiece 101 may not be removed from case 103 once it is inserted into case 103. In other embodiments, the mouthpiece 101 may detachably couple to the case 103 when the mouthpiece 101 is inserted into case 103.

As further shown in the exploded view of FIG. 1B, the case 103 may also house a heating element 110 comprising an atomizing core with porous ceramic bucket 106 and heating wire 107. The ceramic bucket 106 comprising the porous ceramic material as described herein may optionally be a cotton-free, porous ceramic bucket 106, thereby avoiding the introduction of chemical materials into the liquid and vape oil during vaping with the electronic vaporizer 100 described herein. Based on the cotton-free ceramic bucket 106 heating element 110, the electronic vaporizer 100 as described herein may eliminate barriers between the oil and the heating element 110, thereby preserving flavor purity for the user while vaping with the electronic vaporizer 100. In addition, the bucket 106 with porous ceramic material may be formed in a concave, bowl-shaped structure to collect the liquid or vape oil that flows downward from the reservoir 105. The heating element 110 may further comprise a silicon gasket 114 having an inside diameter corresponding to a shape of the ceramic heating element 110 and an outside diameter corresponding to the inside diameter of the glass reservoir 105. In an embodiment, the silicon gasket 114 may feature an inside diameter corresponding to a concave, bowl-shape of the ceramic bucket 106 and an outside diameter corresponding to the inside diameter of the glass reservoir 105.

Referring again to FIG. 1B, the heating wire 107 may couple to a battery 120 within the case 103. As understood by those of skill in the art, the battery 120 may be in communication with both the heating wire 107 and LED 104 in addition to other control features and/or buttons not shown in FIG. 1B, such as a variable vaporizer button for controlling a temperature, such as a predetermined temperature, at which the liquid or vape oils are to be vaporized. The battery 120 may be rechargeable. The battery 120 may be charged based upon the charging port 113 that may provide for a single reversible connector to transmit both power for charging and data for transfers. Although not shown in FIG. 1B, the case 103 may also house a programmable circuit board that is in communication with the battery 120, heating wire 107, and LED 104.

Referring again to FIG. 1B, the reservoir tank 105 may further include at least one tube providing an air flow passage that may be made of glass, including quartz glass. The at least one tube providing an air flow passage may extend axially through the reservoir tank 105 to provide an airway extending between the mouthpiece 101 and the heating element 110 comprising an atomizing core with porous, cotton-free ceramic bucket 106 and heating wire 107. In an embodiment, the reservoir tank 105 may feature the tube providing an air flow passage extending through a central portion of the reservoir tank 105. In another embodiment, the reservoir tank 105 may feature one tube 108 providing an air flow passage through a side of the tank 105 (rather than a central portion of the tank 105), extending between the mouthpiece 101 and the heating element 110. In yet another embodiment, the reservoir tank 105 may feature a first tube and a second tube providing air flow passages through a respective first and a respective second side of the reservoir tank 105, with each tube 108 extending between the mouthpiece 101 and the heating element 110.

As will be described in further detail, a user may view the contents of a glass reservoir tank 105 (as shown in FIG. 1B) through the window 102 in the case 103 (as shown in FIG. 1A). The window 102 may be sized such that window 102 is narrower than the diameter of the cylindrical glass reservoir tank 105 creating the illusion that the cylindrical glass reservoir tank 105 is shaped to consume the entirety of the non-cylindrical case 103. In embodiments of the electronic vaporizer 100 with cylindrical, all-glass reservoir tank 105 featuring a tube providing an air flow passage extending through a central portion of the reservoir tank 105, a user may see the tube when viewing the cylindrical, all-glass reservoir tank 105 through the window 102 in the case 103 (as shown in FIG. 1A). In other embodiments of the electronic vaporizer 100 with cylindrical, all-glass reservoir tank 105 featuring one or more tubes 108 providing an air flow passage extending through or along in parallel with respective sides of the tank 105 (rather than a central portion of the tank 105), a user may not see the one or more tubes 108 when viewing the cylindrical, all-glass reservoir tank 105 through the window 102 in the case 103 (as shown in FIG. 1A). In such embodiments in which the user may not see the one or more tubes 108 when viewing the cylindrical, all-glass reservoir tank 105 through the window 102 in the case 103, the electronic vaporizer 100 may appear to be "post-less" with the illusion that the electronic vaporizer 100 does not include the one or more tubes 108 extending through the tank 105 or along in parallel with respective sides of the tank 105.

Referring again to FIGS. 1A and 1B, the electronic vaporizer 100 with non-cylindrical case 103 and cylindrical, all-glass reservoir tank 105 may be manufactured in different sizes. For example, a volume of the cylindrical, all-glass reservoir tank 105 may be 0.5 ml, 1.0 ml, or 2.0 ml, and a weight of the electronic vaporizer 100 may be 24 g or 26 g. A battery capacity may be approximately 350 Milliampere-hour (mAh), a voltage may be approximately 2.8 V, and a resistance may be approximately 1.4 ohm to 1.6 ohm.

The electronic vaporizer 100 with non-cylindrical case 103 and cylindrical and all-glass reservoir tank 105, as illustrated in FIGS. 1A to 1B, may provide for an improved manufacturing capability to satisfy the demand for a cylindrical, all glass reservoir tank 105 for liquid or vape oil that is capable of residing within a non-cylindrical case 103. As aforementioned, all-glass vape cartridges may be easier to manufacture in cylindrical shapes, such as the cylindrical, all-glass reservoir tank 105, due to the inherent properties of glass and the efficiency of production processes. In addition, based on the all-glass cylindrical reservoir 105 for use within a non-cylindrical case 103, the electronic vaporizer 100 as described herein may promote a desirable oxidation of the vape oils within the reservoir tank 105 while maintaining the desired taste of the vape oil, depending the terpene content of the vape oil.

Figure 2A:
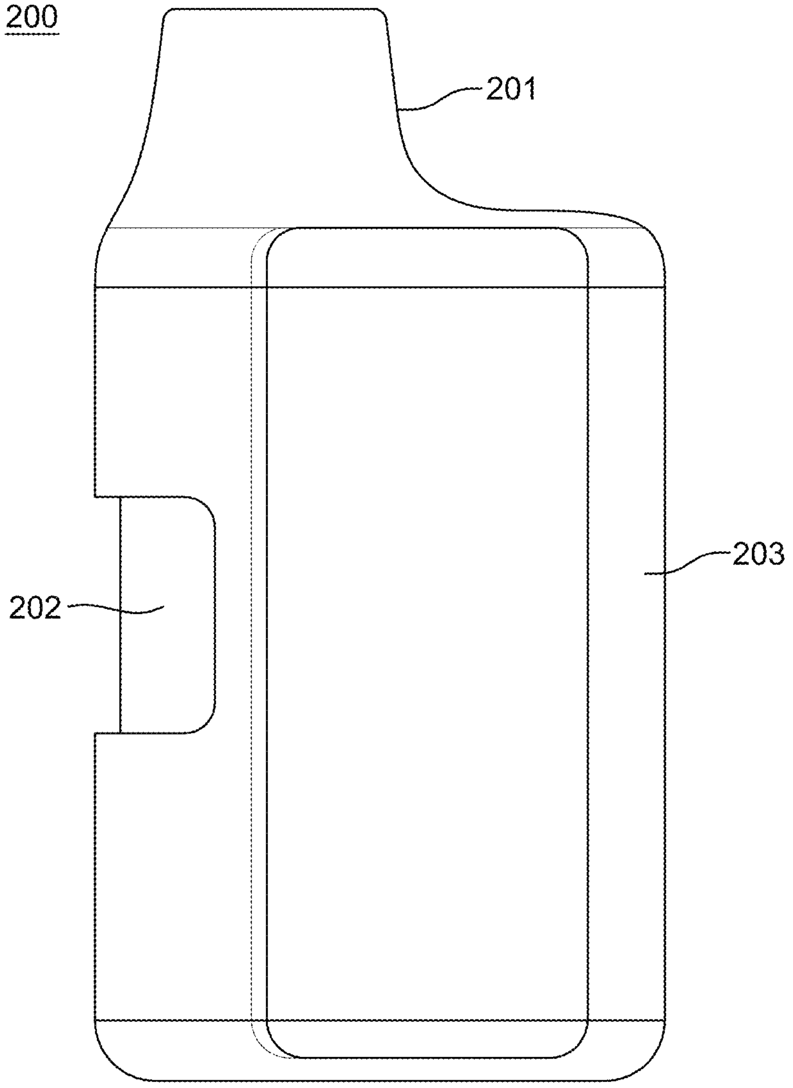
FIG. 2A shows a perspective view of an additional embodiment of an electronic vaporizer having a non-cylindrical case housing a cylindrical glass reservoir as described herein.

FIG. 2A shows an additional example embodiment of electronic vaporizer 200. The electronic vaporizer 200 as shown in FIG. 2A is oriented vertically and may feature a removable mouthpiece 201 at a top portion. The mouthpiece 201 may feature one or more holes or apertures that enables a user to draw air through the mouthpiece 201, so that air may pass through the case 203 of the electronic vaporizer 200 and through the one or more holes or apertures in the mouthpiece 201.

Figure 2B:
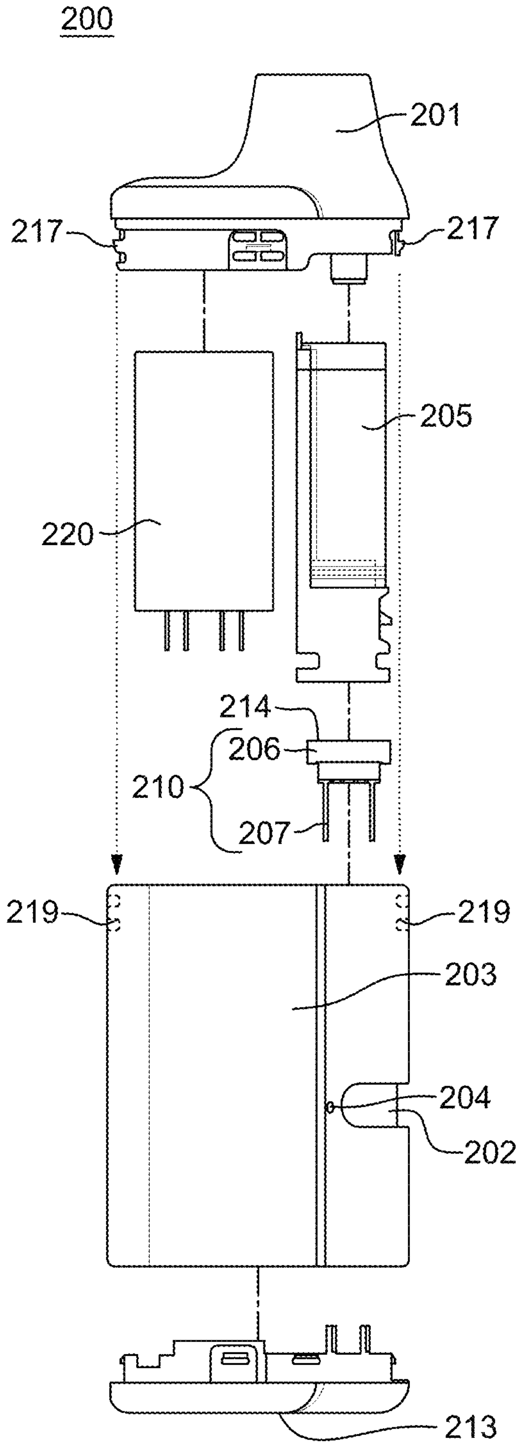
FIG. 2B shows an exploded view of the oral vaporizer cartridge as shown in FIG. 2A.

Referring again to FIG. 2A, the electronic vaporizer 200 may feature a case 203 that may be comprised of a metallic material such as aluminum. As shown the FIG. 2A, the case 203 may feature a non-cylindrical shape, such as a ovular, flattened form that may provide for an ergonomic feel in the hand of a user when using the electronic vaporizer 200. The case 203 may further include a window 202 for purposes of viewing the level or quantity of a liquid or vape oil residing within a glass reservoir tank 205 (as shown in FIG. 2B). In addition, the case 203 may also feature an LED light indicator 204 (as shown in FIG. 2B) that may provide an indication of a voltage level utilized for vaping, a battery level, a power on/off indicator, or other indications as would be appreciated by those of skill in the art.

Referring to the exploded view of the electronic vaporizer as shown in FIG. 2B, the case 203 may house and contain a cylindrical, all-glass reservoir tank 205 for containing the liquid or vape oil. In the embodiment shown in FIGS. 2A-2B, a user may remove the mouthpiece 201 from the top of the case 203 in order to access the cylindrical, all-glass reservoir tank 205 located within the case 203. Such embodiments of the electronic vaporizer 200 may provide environmental advantages by enabling the user to reuse the case 203 housing the battery 220 and refillable cylindrical, all-glass reservoir 205. By removing the mouthpiece 201 from the top of the case 203, the user may access and refill the cylindrical, all-glass reservoir tank 205 with liquids or vape oils in order to utilize the electronic vaporizer 200. A silicone ring 112 (as shown in FIG. 1B) may reside at a top portion of the cylindrical, all-glass reservoir tank 205 to protect the glass rim of the cylindrical, all-glass reservoir tank 205 and to provide for a secure seal and connection between the cylindrical, all-glass reservoir tank 205 and mouthpiece 201.

Referring again to FIGS. 2A-2B, in other embodiments, the mouthpiece 201 may be fixed to the case 203 housing the cylindrical, all-glass reservoir 205. In such embodiments, the entire electronic vaporizer 200 may be disposable, so that once a user has consumed all of the liquid or vape oil within the cylindrical, all-glass reservoir 205 during vaping, the entire electronic vaporizer 200, including the mouthpiece 201 that is fixed to the case 203 containing the cylindrical, all-glass reservoir 205 and battery 220, may be discarded.

Referring to the exploded view of FIG. 2B, the mouthpiece 201 may feature grooves 217 that may correspond to and matingly couple with grooves 219 in the case 203. As illustrated by the downward arrows extending from the mouthpiece 201 to the case 203, the mouthpiece 201 may snap into or lock into the case 203 based on the grooves 217, 219. In an embodiment, the mouthpiece 201 may permanently snap into and lock into the case 203, so that the mouthpiece 201 may not be removed from case 203 once it is inserted into case 203. In other embodiments, the mouthpiece 201 may detachably couple to the case 203 when the mouthpiece 201 is inserted into case 203.

As further shown in the exploded view of FIG. 2B, the case 203 may also house a heating element 210 comprising an atomizing core with porous ceramic bucket 206 and heating wire 207. The ceramic bucket 206 comprising the porous ceramic material as described herein may optionally be a cotton-free, porous ceramic bucket 206, thereby avoiding the introduction of chemical materials into the liquid and vape oil during vaping with the electronic vaporizer 200 described herein. Based on the cotton-free ceramic bucket 206 heating element 210, the electronic vaporizer 200 as described herein may eliminate barriers between the oil and the heating element 210, thereby preserving flavor purity for the user while vaping with the electronic vaporizer 200. In addition, the bucket 206 with porous ceramic material may be formed in a concave, bowl-shaped structure to collect the liquid or vape oil that flows downward from the reservoir 205. The heating element 210 may further comprise a silicon gasket 214 having an inside diameter corresponding to a shape of the ceramic heating element 110 and an outside diameter corresponding to the inside diameter of the glass reservoir 205. In an embodiment, the silicon gasket 214 may feature an inside diameter corresponding to a concave, bowl-shape of the ceramic bucket 206 and an outside diameter corresponding to the inside diameter of the glass reservoir 205.

Referring again to FIG. 2B, the heating wire 207 may couple to a battery 220 within the case 203. As understood by those of skill in the art, the battery 220 may be in communication with both the heating wire 207 and LED 204 in addition to other control features and/or buttons not shown in FIG. 2B, such as a variable vaporizer button for controlling a temperature, such as a predetermined temperature, at which the liquid or vape oils are to be vaporized. The battery 220 may also be charged based upon the type-c charging port 213 that may provide for a single reversible connector to transmit both power for charging and data for transfers. Although not shown in FIG. 2B, the case 203 may also house a programmable circuit board that is in communication with the battery 220, heating wire 207, and LED 204.

Referring again to FIG. 2B, the reservoir tank 205 may further include at least one tube providing an air flow passage that may be made of glass, including quartz glass. The at least one tube providing an air flow passage may extend axially through the reservoir tank 205 to provide an airway extending between the mouthpiece 201 and the heating element 210 comprising an atomizing core with cotton-free ceramic bucket 206 and heating wire 207. In an embodiment, the reservoir tank 205 may feature the tube providing an air flow passage extending through a central portion of the reservoir tank 205 between the protuberance 230 of the mouthpiece 201 and the heating element 210. In another embodiment, the reservoir tank 205 may feature one tube providing an air flow passage through a side of the tank 205 (rather than a central portion of the tank 205), extending between the mouthpiece 201 and the heating element 210. In yet another embodiment, the reservoir tank 205 may feature a first tube and a second tube providing air flow passages through a respective first and a respective second side of the reservoir tank 205, with each tube extending between the mouthpiece 201 and the heating element 210.

As will be described in further detail, a user may view the contents of a glass reservoir tank 205 (as shown in FIG. 2B) through the window 202 in the case 203 (as shown in FIG. 2A). The window 202 may be sized such that window 202 is narrower than the diameter of the cylindrical glass reservoir tank 205 creating the illusion that the cylindrical glass reservoir tank 205 is shaped to consume the entirety of the non-cylindrical case 203. In embodiments of the electronic vaporizer 200 with cylindrical, all-glass reservoir tank 205 featuring a tube providing an air flow passage extending through a central portion of the reservoir tank 205, a user may see the tube when viewing the cylindrical, all-glass reservoir tank 205 through the window 202 in the case 203 (as shown in FIG. 2A). In other embodiments of the electronic vaporizer 200 with cylindrical, all-glass reservoir tank 205 featuring one or more tubes providing an air flow passage extending through or along in parallel with respective sides of the tank 205 (rather than a central portion of the tank 205), a user may or may not see the one or more tubes when viewing the cylindrical, all-glass reservoir tank 205 through the window 202 in the case 203 (as shown in FIG. 2A), from the front-side perspective view of the electronic vaporizer 200 as shown in FIG. 2A. In such embodiments in which the user may not see the one or more tubes when viewing the cylindrical, all-glass reservoir tank 205 through the window 202 in the case 203, the electronic vaporizer 200 may appear to be "postless" with the illusion that the electronic vaporizer 200 does not include the one or more tubes extending through the tank 205 or along in parallel with respective sides of the tank 205, Referring again to FIGS. 2A and 2B, the electronic vaporizer 200 with non-cylindrical case 203 and cylindrical, all-glass reservoir tank 205 may be manufactured in different sizes. For example, a volume of the cylindrical, all-glass reservoir tank 205 may be 0.5 ml, 1.0 ml, or 2.0 ml, and a weight of the electronic vaporizer 100 may be approximately 32 g. A battery capacity may be approximately 380 Milliampere-hour (mAh), a voltage may be approximately 2.8 V, and a resistance may be approximately 1.4 ohm to 1.6 ohm.

The electronic vaporizer 200 with non-cylindrical case 203 and cylindrical and all-glass reservoir tank 205, as illustrated in FIGS. 2A to 2B, may provide for an improved manufacturing capability to satisfy the demand for a cylindrical, all glass reservoir tank 205 for liquid or vape oil that is capable of residing within a non-cylindrical case 203. Based on the all-glass cylindrical reservoir 205 for use within a non-cylindrical case 203, the electronic vaporizer 200 as described herein may promote a desirable oxidation of the vape oils within the reservoir tank 205 while maintaining the desired taste of the vape oil, depending the terpene content of the vape oil.

Figure 3A:
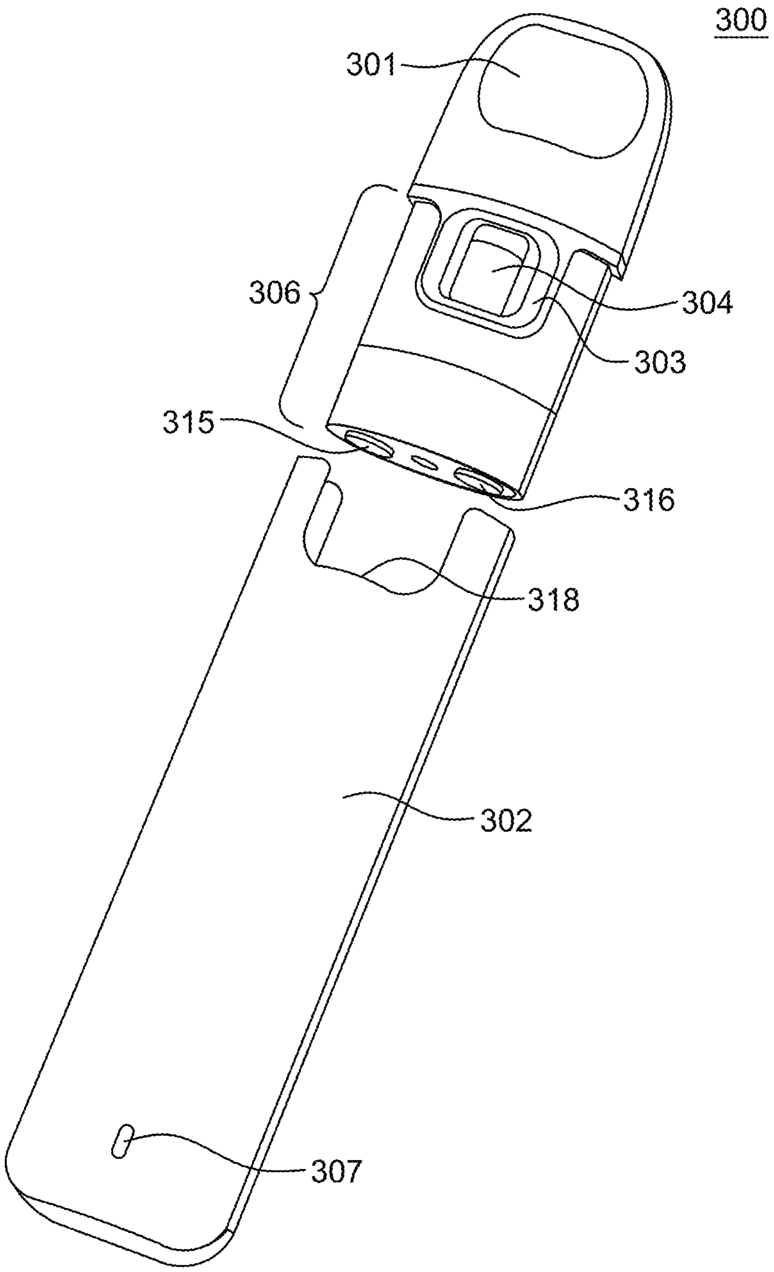
FIG. 3A shows a perspective view of an additional embodiment of an electronic vaporizer having a non-cylindrical case and a removable pod that includes a cylindrical glass reservoir.
Figure 3B:
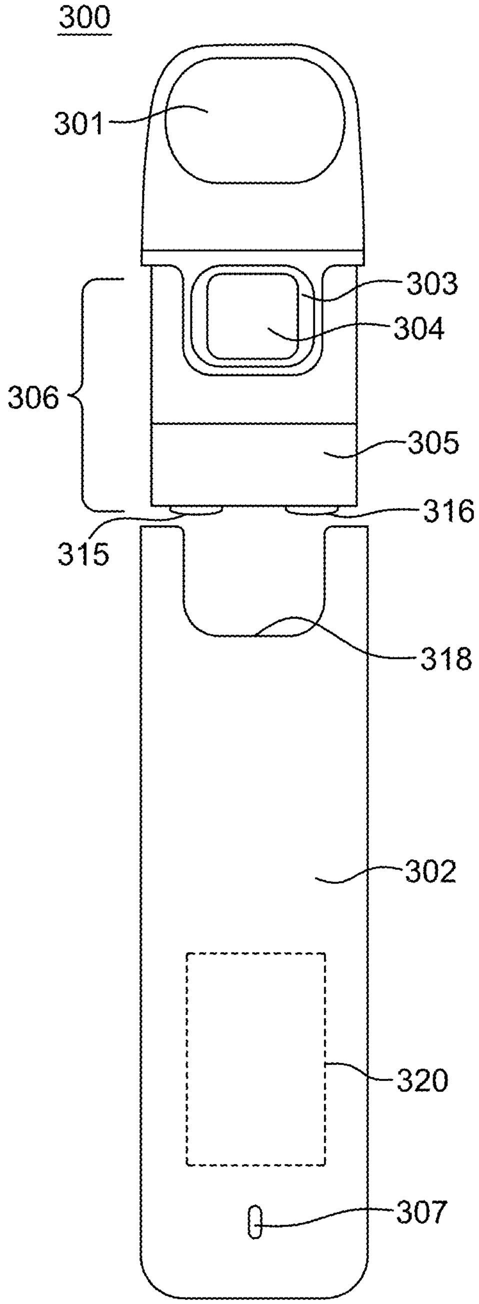
FIG. 3B shows an additional perspective view of the embodiment of the electronic vaporizer as shown in FIG. 3A having a non-cylindrical case and a removable pod that includes a cylindrical glass reservoir.
Figure 3C:
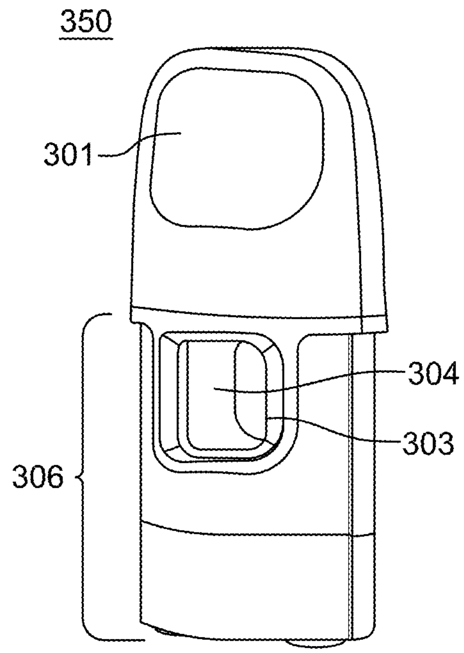
FIG. 3C shows a perspective view of the removable pod as shown in FIGS. 3A-3B including a cylindrical glass reservoir, where the removable pod has been removed from the case of the electronic vaporizer.
Figure 3D:
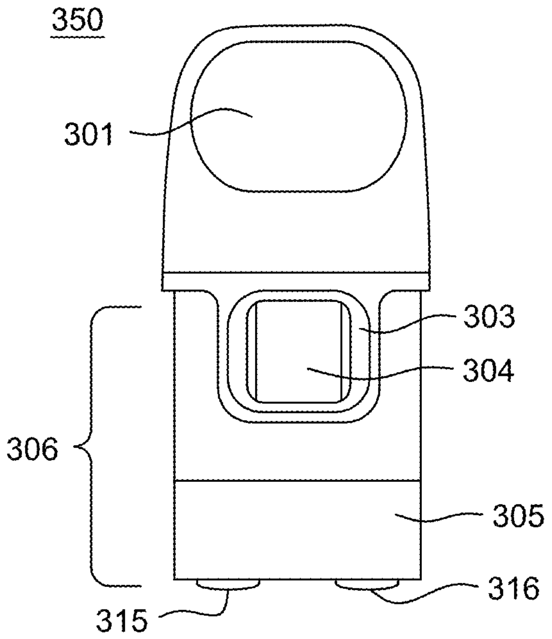
FIG. 3D shows an additional perspective view of the removable pod as shown in FIGS. 3A-3B including a cylindrical glass reservoir, where the removable pod has been removed from the case of the electronic vaporizer.

FIGS. 3A through 3G show an additional example embodiment of electronic vaporizer 300 that may comprise a wholly removable portion 350 (as shown in FIGS. 3C-3D) that includes a removable pod 306 coupled to a mouthpiece 301. The removeable pod 306 may include the cylindrical, all-glass reservoir 304 that may be refilled upon removal of the removable pod 306 from the case 302 (the case also known as a "pen") of the electronic vaporizer 300. The removable pod 306 portion including the cylindrical, all-glass reservoir 304 may be disposable and replaced with a new pod, rather than refilling. Additionally the replaceable pods may allow oil manufacturers to sell multiple pods, and the consumer may reuse the battery 320 (as shown in FIG. 3B) that is housed within the case 302 and dispose of used-up pods without the need to dispose of the case 302 (the pen) that houses the battery 320. Such embodiments of the electronic vaporizer 300 with disposable, wholly removable pod 306 portion including the cylindrical, all-glass reservoir 304 may provide environmental benefits by enabling the user to reuse the case 302 that houses the battery 320. In other embodiments of the electronic vaporizer 300 as described herein that may comprise a wholly removable pod 306 portion including the cylindrical, all-glass reservoir 304, the mouthpiece 301 may be removable by the user from the top of the wholly removable pod 306 to expose the cylindrical, all-glass reservoir 304, so that a user may refill and reuse the wholly removable pod 306 portion including the cylindrical, all-glass reservoir 304.

Referring to FIGS. 3A and 3B, perspective views are shown of the wholly removable portion 350 (as shown in FIGS. 3C-3D) that includes a removable pod 306 with a cylindrical glass reservoir 304. In FIGS. 3A and 3B, the pod 306 has been removed from the case 302 of the electronic vaporizer 300. The wholly removable portion 350 (as shown in FIGS. 3C-3D) that comprises the removable pod 306 with the cylindrical glass reservoir tank 304 may detachably couple to the mouthpiece 301 at an upper portion of the wholly removable portion 350. A lower portion 305 of the wholly removable portion 350 may include battery connectors 315, 316 that may connect to a battery located within the case 302. Because an outer diameter of the wholly removable portion 350 is less than an inner diameter of the case 302, the wholly removable portion 350 may slide into the case 302 so that the battery connectors 315, 316 may come into contact with the battery that is housed inside the case 302.

Figure 3E:
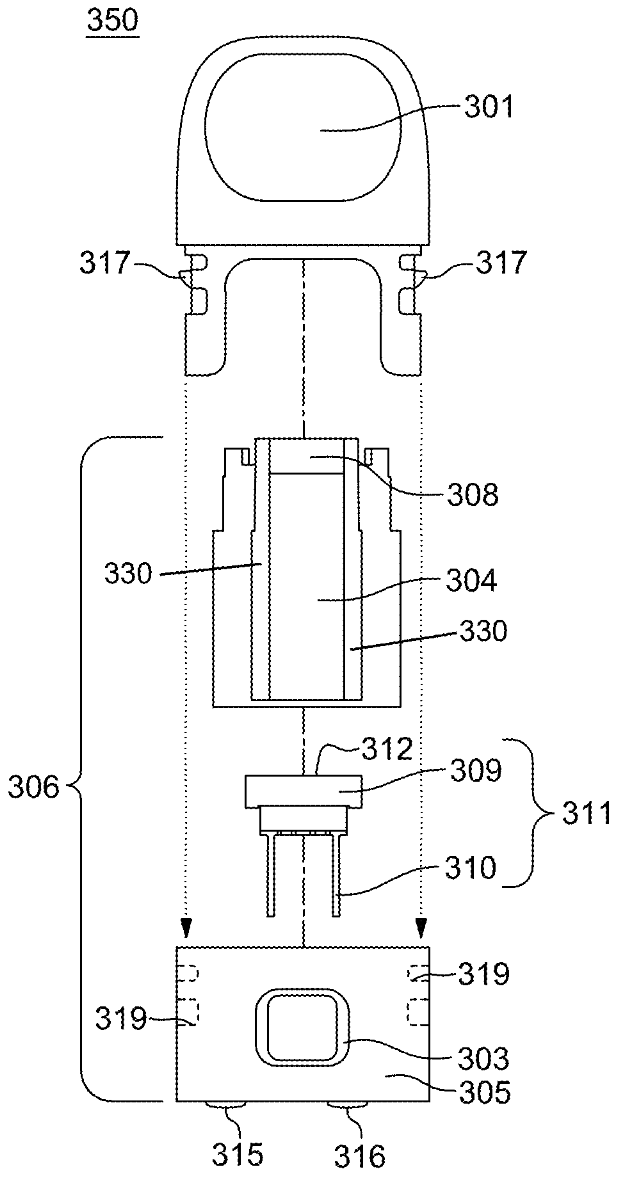
FIG. 3E shows an exploded view of the removable pod as shown in FIGS. 3C-3D including a cylindrical glass reservoir.

Referring to FIGS. 3A through 3D, it is to be understood that the wholly removable wholly removable portion 350 may include a heating element 311 (as shown in the exploded view of the wholly removable wholly removable portion 350 in FIG. 3E) comprising an atomizing core with a porous ceramic bucket 309 and heating wire 310. The ceramic bucket 309 comprising the porous ceramic material as described herein may optionally be a cotton-free, porous ceramic bucket 309, thereby avoiding the introduction of chemical materials into the liquid and vape oil during vaping with the electronic vaporizer 300 described herein. Based on the cotton-free ceramic bucket 309 heating element 311, the electronic vaporizer 300 as described herein may eliminate barriers between the oil and the heating element 311, thereby preserving flavor purity for the user while vaping with the electronic vaporizer 300.

FIGS. 3C-3D provide perspective views of a wholly removable wholly removable portion 350 that comprises the removable pod 306 with the cylindrical glass reservoir tank 304. In FIGS. 3C-3D, the wholly removable portion 350 with cylindrical glass reservoir tank 304 has been removed from the case 302 (as shown in FIGS. 3A-3B) of the electronic vaporizer 300. As further shown in FIGS. 3C-3D, a mouthpiece 301 may be detachably coupled to the wholly removable portion 350 that comprises the removable pod 306. The wholly removable portion 350 that comprises the removable pod 306 with the cylindrical glass reservoir tank 304 may further comprise the window 303 for purposes of viewing the level or quantity of a liquid or vape oil residing within a glass reservoir tank 304. The ability to wholly remove the wholly removable portion 350 that comprises the removable pod 306 with the cylindrical glass reservoir tank 304 from the case 302 provides a user with enhanced ability to access and refill the cylindrical glass reservoir tank 304.

Referring to FIG. 3E, an exploded view of the wholly removable portion 350 is shown. As illustrated in FIG. 3E, the removable pod 306 of the wholly removable portion 350 may detachably couple to the mouthpiece 301. For example, the mouthpiece 301 may feature grooves 317 that may correspond to and matingly couple with grooves 319 in the lower portion 305 of the pod 306. As illustrated by the downward arrows extending from the mouthpiece 301 to the lower portion 305 of the pod 306, the mouthpiece 301 may snap into or lock into the lower portion 305 of the pod 306 based on the grooves 317, 319. In an embodiment, the mouthpiece 301 may permanently snap into and lock into the lower portion 305 of the pod 306, so that the mouthpiece 301 may not be removed from the lower portion 305 once it is inserted into the lower portion 305. In other embodiments, the mouthpiece 305 may detachably couple to the lower portion 305 of the pod 306 when the mouthpiece 301 is inserted into the lower portion 305 of the pod 306.

Referring again to FIG. 3E, the cylindrical glass reservoir tank 304 may also include the heating element 311 comprising an atomizing core with cotton-free ceramic bucket 309 and heating wire 310. The cotton-free ceramic bucket 309 may comprise a porous ceramic material that may be formed in a concave, bowl-shaped structure to collect the liquid or vape oil that flows downward from the cylindrical, all-glass reservoir tank 304. A silicone ring 308 may reside at a top portion of the cylindrical, all-glass reservoir tank 304 to protect the glass rim of the cylindrical, all-glass reservoir tank 304 and to provide for a secure seal and connection between the cylindrical, all-glass reservoir tank 304 and mouthpiece 301. The heating element 311 may further comprise a silicon gasket 312 having an inside diameter corresponding to a shape of the ceramic heating element 311 and an outside diameter corresponding to the inside diameter of the glass reservoir 304. In an embodiment, the silicon gasket 312 may feature an inside diameter corresponding to a concave, bowl-shape of the ceramic bucket 309 and an outside diameter corresponding to the inside diameter of the glass reservoir 304. The heating wire 310 may lead to and couple with the battery connectors 315, 316 (also shown in FIGS. 3A and 3B) located at a lower portion 305 of the pod 306, so that the heating element 311 may be in contact with the battery 320 (not shown in FIG. 3E) when the wholly removable portion 350 with pod 306 is inserted within the opening 318 of the case 302.

Referring again to the exploded view of the wholly removable portion 350 in FIG. 3E, a user may view the contents including an amount of liquid or vape oil within the cylindrical glass reservoir tank 304 through the window 303 in the pod 306. The window 303 may be sized such that window 303 is narrower than the diameter of the cylindrical glass reservoir tank 304 creating the illusion that the cylindrical glass reservoir tank 304 is shaped to consume the entirety of the pod 306.

Figure 3F:
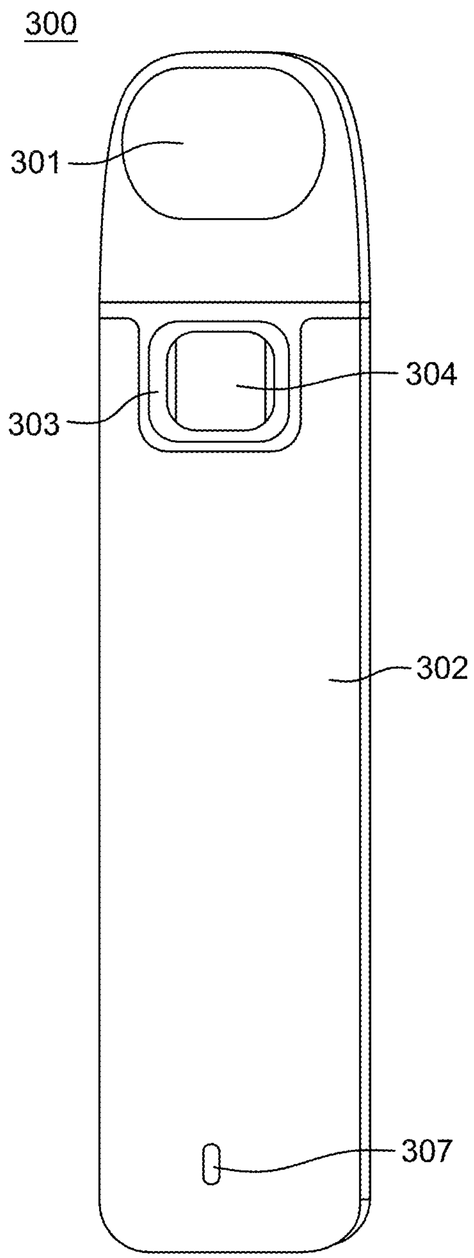
FIG. 3F shows a perspective view of the embodiment of an electronic vaporizer as shown in FIGS. 3A-3B having a non-cylindrical case and a removable pod that includes a cylindrical glass reservoir where the removable pod is inserted within the case.
Figure 3G:
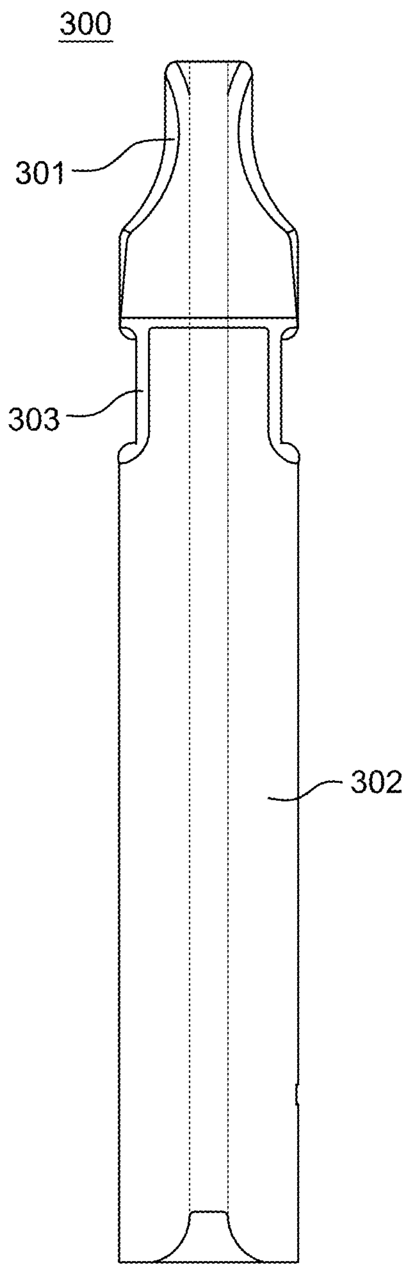
FIG. 3G shows an additional perspective view of the embodiment of the electronic vaporizer as shown in FIG. 3F having a non-cylindrical case and a removable pod that includes a cylindrical glass reservoir where the removable pod is inserted within the case.

Referring to FIGS. 3F and 3G, perspective views are illustrated of the embodiment of the electronic vaporizer 300 as shown in FIGS. 3A-3B having a non-cylindrical case 302 and a removable pod 306 that includes a cylindrical, all-glass reservoir tank 304, where the removable pod 306 (not shown in FIGS. 3F-3G) is inserted within the opening 318 of the case 302. The electronic vaporizer 300 as shown in FIG. 3F is oriented vertically and may feature a removable mouthpiece 301 at a top portion. The mouthpiece 301 may feature one or more holes or apertures that enables a user to draw air through the mouthpiece 301, so that air may pass through the case 302 of the electronic vaporizer 300 and through the one or more holes or apertures in the mouthpiece 301. The electronic vaporizer 300 may feature the case 302 that may be comprised of a metallic material such as aluminum. As shown in FIG. 3F, the case 302 may feature a non-cylindrical shape, such as a ovular, flattened form that may provide for an ergonomic feel in the hand of a user when using the electronic vaporizer 300. The pod 306 may further include the window 303 for purposes of viewing the level or quantity of a liquid or vape oil residing within a glass reservoir tank 304. In addition, the case 302 may also feature an LED light indicator 307 that may provide an indication of a voltage level utilized for vaping, a battery level, a power on/off indicator, or other indications as would be appreciated by those of skill in the art.

Referring again to FIG. 3F, a user may view the contents including an amount of liquid or vape oil within the glass reservoir tank 304 through the window 303 in the pod 306. The window 303 may be sized such that window 303 is narrower than the diameter of the cylindrical glass reservoir tank 304 creating the illusion that the cylindrical glass reservoir tank 304 is shaped to consume the entirety of the pod 306. In embodiments of the electronic vaporizer 300 with cylindrical, all-glass reservoir tank 304 featuring a tube providing an air flow passage extending through a central portion of the reservoir tank 304, a user may see the tube when viewing the cylindrical, all-glass reservoir tank 304 through the window 303 in the pod 306 (as shown in FIG. 3F). In other embodiments of the electronic vaporizer 300 with cylindrical, all-glass reservoir tank 304 featuring one or more tubes 330 providing an air flow passage extending through or along in parallel with respective sides of the tank 304 (rather than a central portion of the tank 304), a user may not see the one or more tubes 330 when viewing the cylindrical, all-glass reservoir tank 304 through the window 303 in the pod 306 (as shown in FIG. 3F). In such embodiments in which the user may not see the one or more tubes 330 when viewing the cylindrical, all-glass reservoir tank 304 through the window 303 in the pod 306, the pod 306 may appear to be "postless" with the illusion that the pod 306 does not include the one or more tubes 330 extending through the tank 304 or along in parallel with respective sides of the tank 304.

Referring to FIG. 3G, a side-perspective view is shown of the additional embodiment of the electronic vaporizer of FIG. 3F that may comprise a wholly removable pod 306 with mouthpiece 301 (as shown in FIGS. 3A through 3D). The removable pod 306 is not visible in FIG. 3G, as it is inserted within the opening 318 of case 302 of the electronic vaporizer 300. The removeable pod 306 (not shown in FIG. 3G) may include the cylindrical, all-glass reservoir 304 that may be refilled upon removal of the removable pod 306 from the case 302 of the electronic vaporizer 300. The side-perspective view of FIG. 3G further illustrates the window 303 for purposes of viewing the level or quantity of a liquid or vape oil residing within a glass reservoir tank 304 within the pod 306.

Referring again to FIGS. 3A and 3G, the electronic vaporizer 300 with non-cylindrical case 302 and wholly removable portion 350 comprising the cylindrical glass reservoir tank 304 may be manufactured in different sizes. For example, a volume of the cylindrical glass reservoir tank 304 may be 0.5 ml or 1.0 ml. The dimensions of the case 302 with the mouthpiece 301 detachably coupled to the top of the case 302 (as shown in FIG. 3A) may include a length of 104 mm, a width of 23.5 mm, and a depth of 15.6 mm. A battery capacity may be approximately 350 Milliampere-hour (mAh).

Figure 4A:
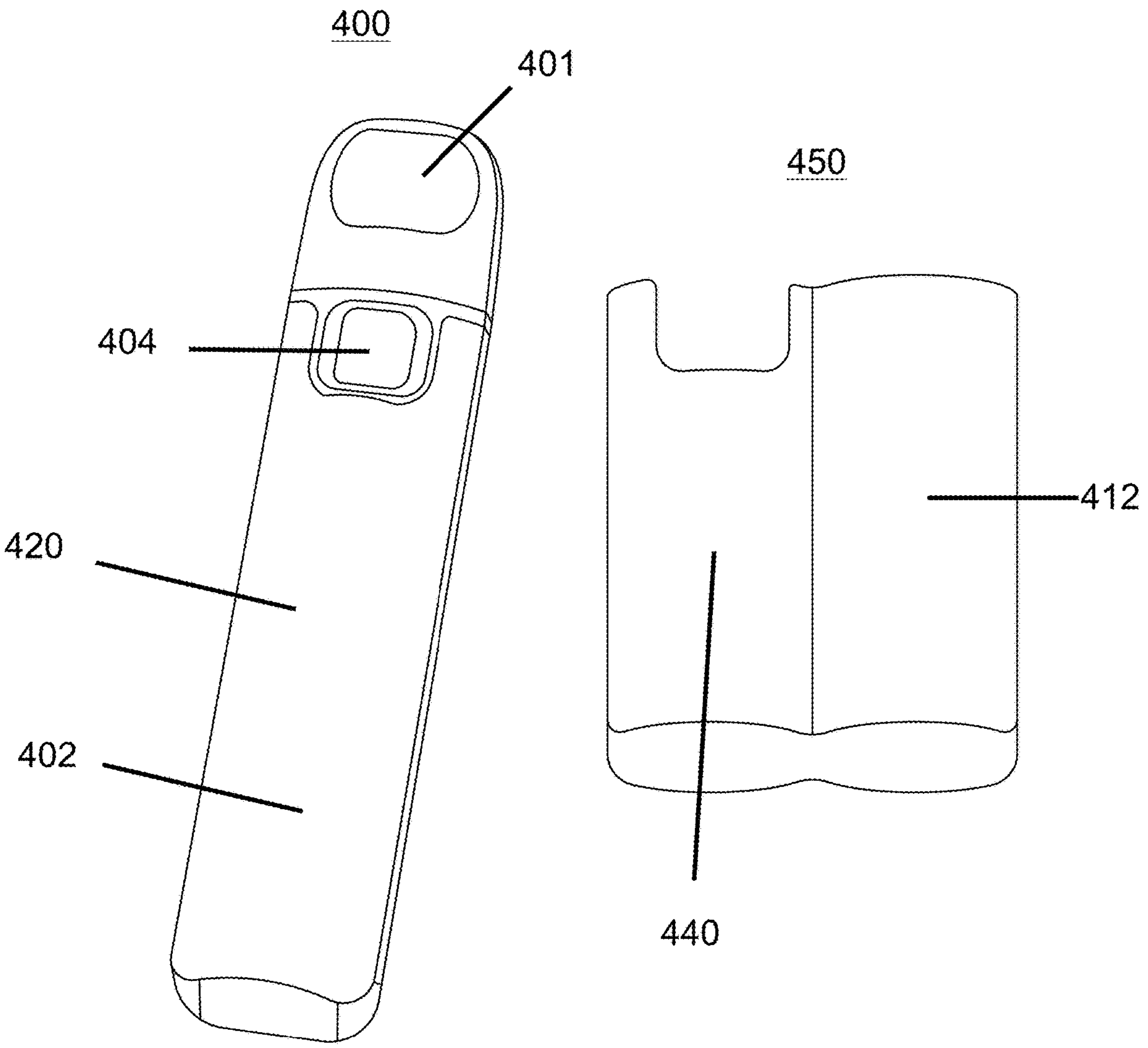
FIG. 4A shows an additional example embodiment of a removable pod that may be interchangeable between different shaped bases of respective electronic vaporizers as described herein.

FIGS. 4A through 4D show an additional example embodiment of a removable pod 406 that may be interchangeable between different shaped bases 420, 440 of respective electronic vaporizers 400, 450, as described herein. The electronic vaporizers 400, 450 as shown in FIG. 4A may each be compatible with the wholly removable pod 406 with mouthpiece 401 (as shown in FIGS. 4A through 4D). The removeable pod 406 may include the cylindrical, all-glass reservoir 404 that may be refilled upon removal of the removable pod 406 from the bases 420, 440 of the respective electronic vaporizers 400, 450 as described herein. Each of the bases 420, 440 may feature a respective case 402, 412. To refill the all-glass reservoir 404 within the removeable pod 406, a user may remove the mouthpiece 401 to access and refill the all-glass reservoir 404.

Referring again to FIGS. 4A through 4D, it is to be understood that the removable pod 406 may feature a similar configuration and interior components, including the cylindrical, all-glass reservoir 404, as the removeable pod 306 that is described in FIGS. 3A through 3G. In addition, it is further understood that the cases 402, 412 of respective electronic vaporizers 400, 450 may feature a similar configuration and interior components as the case 302 that is described in FIGS. 3A through 3B.

Referring to FIG. 4A, the removable pod 406 may be interchangeable between the first electronic vaporizer 400 having a thin, longitudinal shape and the second electronic vaporizer 450 having a wider, more square shape. Depending on a user's ergonomic preference, such as whether one of the electronic vaporizers 400, 450 would more conveniently fit within a pocket or hand of a user, the user may conveniently and easily interchange the removable pod 406 between the different shaped bases 420, 440 of the respective electronic vaporizers 400, 450, as described herein.

Figure 4B:
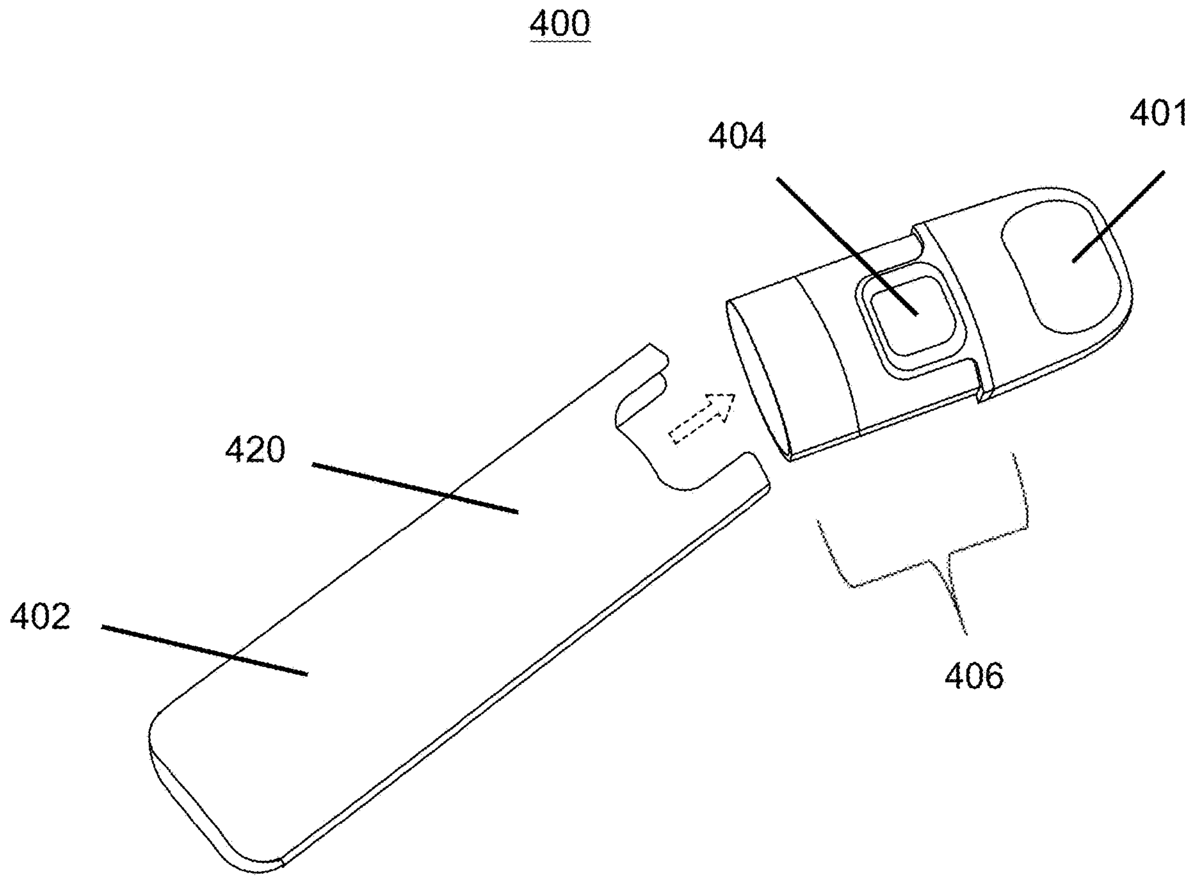
FIG. 4B shows the removable pod as illustrated in FIG. 4A being removed from a first base of an electronic vaporizer as described herein.

Referring to FIG. 4B, a perspective view is provided of the removable pod 406 as illustrated in FIG. 4A being removed from the base 420 of the first electronic vaporizer 400 having the thin, longitudinal shape.

Figure 4C:
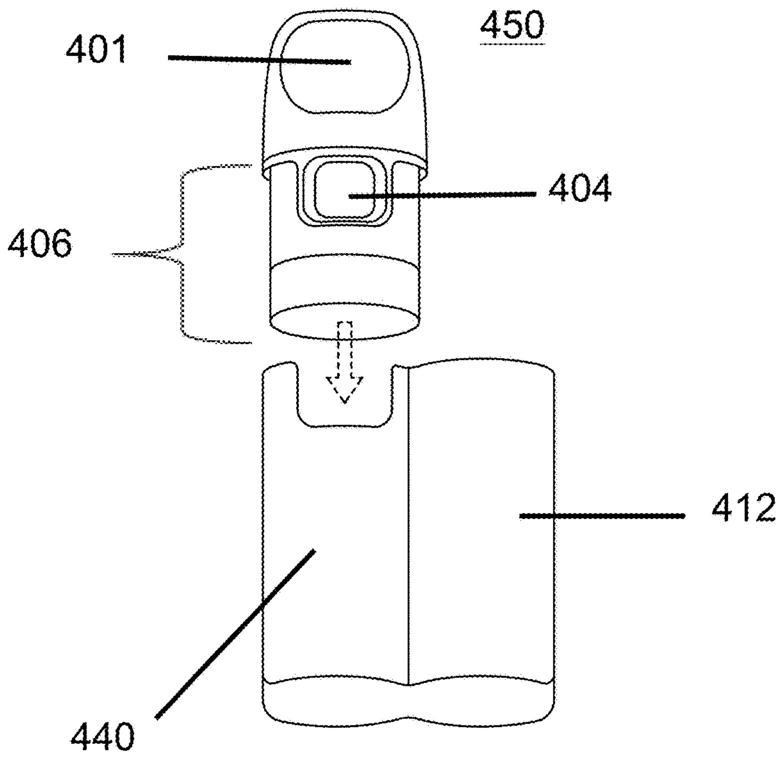
FIG. 4C shows the removable pod as illustrated in FIGS. 4A-4B being inserted into a second base of an electronic vaporizer as described herein, where the first and second bases have different shapes.

Referring to FIG. 4C, a perspective view is provided of the removable pod 406 as illustrated in FIG. 4A-4B being inserted into the base 440 of the second electronic vaporizer 450 having the wider, more square shape.

Figure 4D:
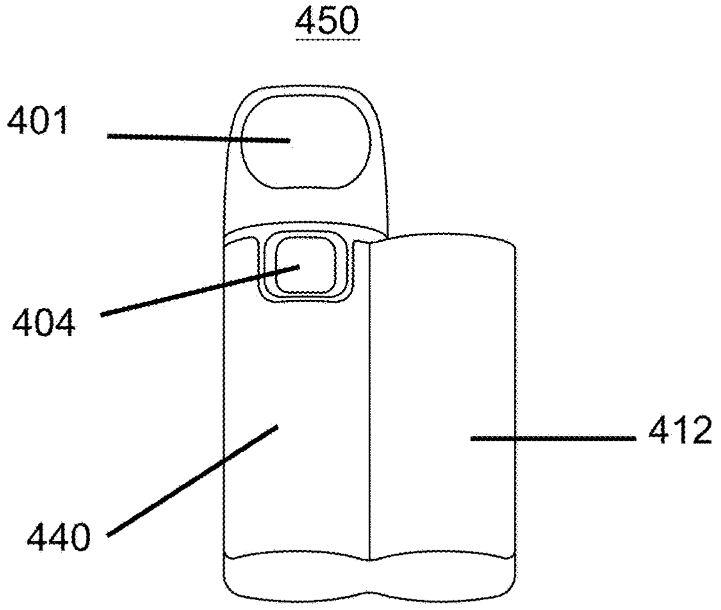
FIG. 4D shows the removable pod as illustrated in FIGS. 4A-4C after being completely inserted into the second base of an electronic vaporizer as described herein, where the first and second bases have different shapes.

Referring to FIG. 4D, a perspective view is provided of the removable pod 406 as illustrated in FIGS. 4A-4C after being completely inserted the base 440 of the second electronic vaporizer 450 having the wider, more square shape.

Although features and elements are described above in particular combinations, each feature or element can be used alone without the other features and elements or in various combinations with or without other features and elements.

What is claimed is:

1. An apparatus for vaporizing liquids comprising:
a mouthpiece; and
a non-cylindrical case having a first end coupled to the mouthpiece,
the non-cylindrical case configured to house interior components including:
a cylindrical glass reservoir;
a battery;
a heating element, and
a plurality of tubes providing air flow passages extending from the heating element to the mouthpiece,
wherein the plurality of tubes providing air flow passages are positioned in a space between an outside wall of the cylindrical glass reservoir and an inside wall of the non-cylindrical case.

2. The apparatus for vaporizing liquids of claim 1, wherein the heating element includes:
a porous ceramic bucket,
a heating wire coupled to the battery, and
a first portion of the heating wire that is partially embedded in the ceramic bucket.

3. The apparatus for vaporizing liquids of claim 2, wherein the porous ceramic bucket is cotton-free.

4. The apparatus for vaporizing liquids of claim 1, wherein the non-cylindrical case further comprises a window configured to provide visibility of the cylindrical glass reservoir,
wherein a width of the window is narrower than a width of the cylindrical glass reservoir.

5. The apparatus for vaporizing liquids of claim 1, wherein the non-cylindrical case is comprised of aluminum.

6. The apparatus for vaporizing liquids of claim 1, wherein the non-cylindrical case includes an LED indicator.

7. The apparatus for vaporizing liquids of claim 1, wherein at least a portion of an interior diameter of the non-cylindrical case is larger than an exterior diameter of the cylindrical glass reservoir.

8. The apparatus for vaporizing liquids of claim 1, wherein the non-cylindrical case further comprises a second end including a charging port.

9. The apparatus for vaporizing liquids of claim 1, wherein the plurality of tubes providing air flow passages and the cylindrical glass reservoir are comprised of quartz glass.

10. The apparatus for vaporizing liquids of claim 2 further comprising:
a push-button disposed on the non-cylindrical case configured to select at least one predetermined voltage provided by the battery to the heating wire, the at least one predetermined voltage associated with a temperature of the heating element.

11. An apparatus for vaporizing liquids comprising:
a mouthpiece;
a non-cylindrical removable pod coupled to the mouthpiece and including:
a cylindrical glass reservoir;
a heating element;

a plurality of tubes providing air flow passages extending from the heating element to the mouthpiece, the plurality of tubes providing air flow passages positioned in a space between an outside wall of the cylindrical glass reservoir and an inside wall of the non-cylindrical removable pod; and at least one battery connector disposed at a lower portion of the non-cylindrical removable pod;

and a non-cylindrical case having an opening to slidably receive the non-cylindrical removable pod, the non-cylindrical case including a battery, wherein the non-cylindrical removable pod is insertable within and removable from the non-cylindrical case.

12. The apparatus for vaporizing liquids of claim 11, wherein the heating element includes:

a porous ceramic bucket, and a heating wire configured to detachably couple to the battery via the at least one battery connector when the pod is inserted within the non-cylindrical case.

13. The apparatus for vaporizing liquids of claim 12, wherein the porous ceramic bucket is cotton-free.

14. The apparatus for vaporizing liquids of claim 11, wherein the removable pod further comprises a window configured to provide visibility of the cylindrical glass reservoir, wherein a width of the window is narrower than a width of the cylindrical glass reservoir.

15. The apparatus for vaporizing liquids of claim 11, wherein the non-cylindrical case is comprised of aluminum.

16. The apparatus for vaporizing liquids of claim 11, wherein the non-cylindrical case includes an LED indicator.

17. The apparatus for vaporizing liquids of claim 11, further comprising another non-cylindrical case having a second shape different than a first shape of the non-cylindrical case, wherein the removable pod is insertable within and removable from the another-cylindrical case.

18. The apparatus for vaporizing liquids of claim 11, wherein the plurality of tubes providing air flow passages and the cylindrical glass reservoir are comprised of quartz glass.

19. The apparatus for vaporizing liquids of claim 12 further comprising:

a push-button disposed on the non-cylindrical case configured to select at least one predetermined voltage provided by the battery to the heating wire, the at least one predetermined voltage associated with a temperature of the heating element.

20. The apparatus for vaporizing liquids of claim 1, further comprising:

a silicone ring disposed at a top portion of the cylindrical glass reservoir to provide a seal between the cylindrical glass reservoir and the mouthpiece.

* * * * *